H. A. WATERMAN.
TRACTION WHEEL.
APPLICATION FILED SEPT. 16, 1915.
1,187,577. Patented June 20, 1916.
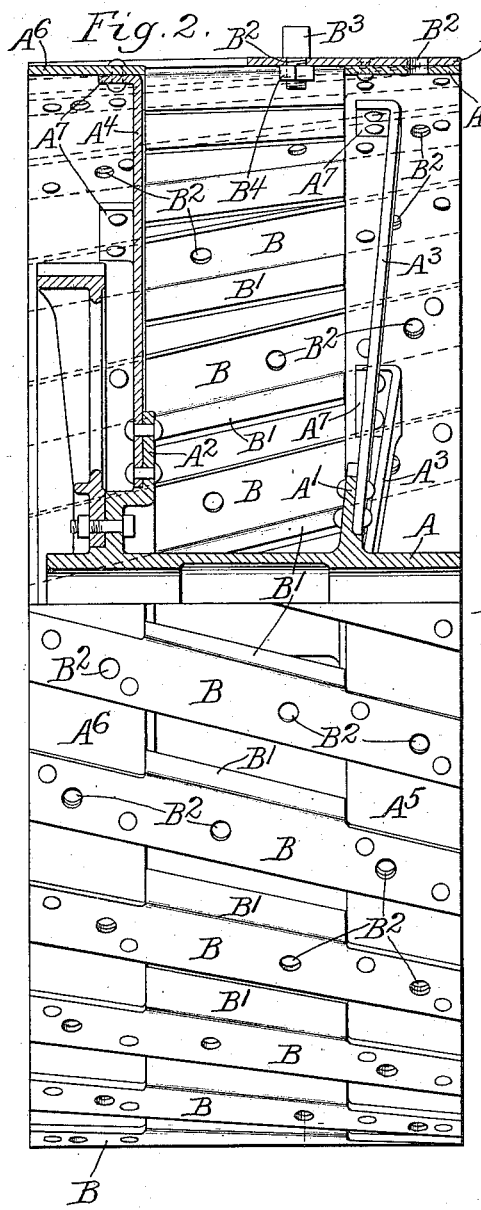
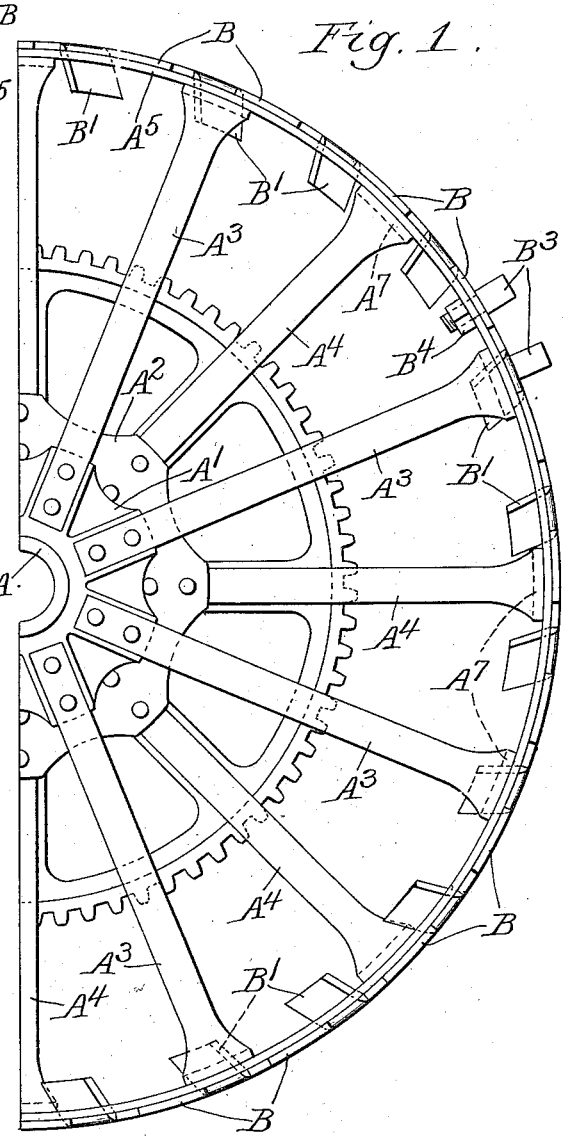
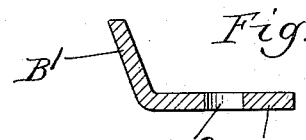
Witnesses.
Edward T. Wray.
Laurel M. Doremus
Inventor.
Henry A. Waterman.
by Parker & Carter
Attorneys.

UNITED STATES PATENT OFFICE.

HENRY A. WATERMAN, OF LAPORTE, INDIANA, ASSIGNOR, BY MESNE ASSIGNMENTS, TO ADVANCE-RUMELY COMPANY, OF LAPORTE, INDIANA, A CORPORATION OF INDIANA.

TRACTION-WHEEL.

1,187,577.  Specification of Letters Patent.  Patented June 20, 1916.

Application filed September 16, 1915. Serial No. 50,923.

*To all whom it may concern:*

Be it known that I, HENRY A. WATERMAN, a citizen of the United States, residing at Laporte, in the county of Laporte and State of Indiana, have invented a certain new and useful Improvement in Traction-Wheels, of which the following is a specification.

My invention relates to improvements in traction wheels and has for one object, to provide a traction wheel which may be used in connection with motor vehicles and the like which will hold onto the ground and prevent slipping, whose adhesive force will increase as the wheel sinks into soft ground and which can be used on ordinary improved highways without danger or damage to the road surface.

My invention is illustrated more or less diagrammatically in the accompanying drawings wherein—

Figure 1 is a side elevation of a wheel. Fig. 2 is an elevation in part section looking in a direction at right angles to the axle. Fig. 3 is a cross section of one of the cleats.

A is a hub. At either end it is provided with flanges $A^1$ $A^2$. From these flanges project outwardly the radial spokes $A^3$ $A^4$ respectively. These spokes are staggered, that is to say, the spokes on one end of the hub are half-way between the spokes on the other end of the hub. Each series of spokes supports an annular cylindrical ring $A^5$ $A^6$. These two rings are parallel and arranged side by side, and they project outwardly beyond the ends of the spokes, the spokes being upset as at $A^7$ to support the rings. Rigidly attached to the outer periphery of these two rings are diagonal cleats or tread pieces B. These tread pieces are so arranged that they overlap so that as shown there are always at least two cleats in contact with the ground no matter how hard the surface. The softer the surface the deeper the wheel will sink and the more cleats there will be in contact with the ground. These cleats are made of angle irons cut away at their ends where they rest upon the rims, the flange $B^1$ projecting inwardly in a general radial direction between the two tread rings. They act in effect as spacers holding the two rings separate to assist in carrying any load or resisting any approach of the rings, which might under some circumstances be sufficient to overcome the attachment of the cleats themselves to the tread rings. The cleats, it will be noted, are apertured as at $B^2$, and the removable traction lugs $B^3$ may be inserted in these apertures and held in position by nuts $B^4$ when it is desired to add to the traction given by the cleats.

It will be evident while I have shown in my drawing an operative device, that many changes might be made both in size and arrangement of parts without departing materially from the spirit of my invention, and I wish that my specification and showing will be regarded therefore in a sense diagrammatic.

The use of my invention is as follows: The traction wheel or drum is assembled in the usual manner and mounted for operation in position on the motor vehicle. The drive will be applied through the bull wheel as indicated, to the hub, from the hub through the two sets of radial arms to the tread portion of the wheel, made up as it is of two cylindrical rings and the inclined cleats. As long as the vehicle is moving over the ordinary hard road, the wheel will sink in little if any. The cleats are thin and broad, they are backed up by the two cylindrical rings and a comparatively large supporting surface is available, thus the wheel rolls along in a smooth and easy manner and the wheel as thus constituted can be used over the usual type of improved roads without damaging the road, breaking the law or losing tractive effect. When the wheel travels off of the hard road onto a soft surface such as a plowed field where it may sink in the cleats and the ring sink in until the soil beneath the effective tread surfaces is sufficiently compacted so that the load may be carried. This sinking is limited of course also by the increased tread surface available for the further in the wheel sinks, the larger the proportion of it in contact with the ground. The openings through the wheel make the wheel self-cleaning. There is always a continuous movement of material through the wheel radially toward the center, and any material left in the wheel as it goes around is forced out by the new material when that part of the wheel again rests upon the ground. When the wheel besides supporting a load is exerting tractive force, it tends to rotate with respect to the ground supporting it. This rotation of the hard surface is resisted only by the frictional contact between the wheel and the ground, but when the wheel sinks in, the cleats with their inwardly bent flanges tend to bodily displace the individual lumps or sections of material projecting through the wheel. If the cleats were not provided with the inwardly extending lugs, their relatively sharp edges would shear off the ground sections but the lugs prevent this and insure that the driving force shall be compelled to throw aside or displace the entire ground section. This obviously results in materially increasing the tractive force of the wheel. When even greater tractive force is required, grouters or lugs are inserted in the perforations in the cleats and rings, and by their further projection down into the supporting surface, they add to the tractive effect of the wheel.

I claim:

1. A traction wheel comprising two parallel cylindrical tread rings, a series of inclined flat grouters supported at either end on one of said rings, the inclination of said grouters to the axis of the wheel and their distance one from another being such that at least two of them are always in contact with the ground, flanges inwardly extending along one edge of each of said grouters between the cylindrical rings, projecting inwardly beyond the inner peripheries of the cylindrical rings.

2. A traction wheel comprising two parallel cylindrical tread rings, a series of flat grouters supported at either end upon said rings, flanges projecting inwardly from one edge of each of said grouters between said rings.

3. A traction wheel comprising two parallel cylindrical tread rings, a series of flat grouters supported at either end upon said rings, flanges projecting inwardly from one edge of each of said grouters between said rings, said flanges being substantially at right angles to the tread surfaces of said grouters and extending inwardly beyond the inner edges of the tread rings.

4. A traction wheel comprising two parallel cylindrical tread rings, a series of inclined flat grouters supported at either end on one of said rings, flanges inwardly extending along one edge of each of said grouters between the cylindrical rings, projecting inwardly beyond the inner peripheries of the cylindrical rings.

In testimony whereof, I affix my signature in the presence of two witnesses this 7th day of September, 1915.

HENRY A. WATERMAN.

Witnesses:
E. L. MARTIN,
A. F. MOHR.